United States Patent [19]

Kimm

[11] 4,322,059
[45] Mar. 30, 1982

[54] SCARFING TORCH

[75] Inventor: Dieter Kimm, Dreieich, Fed. Rep. of Germany

[73] Assignee: Messer Griesheim GmbH, Frankfurt am Main, Fed. Rep. of Germany

[21] Appl. No.: 258,675

[22] Filed: Apr. 29, 1981

[30] Foreign Application Priority Data

May 16, 1980 [DE] Fed. Rep. of Germany ....... 3018647

[51] Int. Cl.³ .............................................. B23K 7/08
[52] U.S. Cl. .................................................. 266/75
[58] Field of Search ................... 266/75, 74; 148/9 C, 148/9.5

[56] References Cited

U.S. PATENT DOCUMENTS

| 2,754,234 | 7/1956 | Holub et al. | 148/9.5 |
| 3,856,282 | 12/1974 | Lucht | 266/75 |
| 4,103,877 | 8/1978 | Pfeuffer | 266/75 |

Primary Examiner—W. Stallard
Attorney, Agent, or Firm—Connolly and Hutz

[57] ABSTRACT

A scarfing torch includes upper and lower preheating blocks spaced apart to form a scarfing oxygen channel and having a powder supply consisting of a nozzle provided in one of the preheating blocks.

6 Claims, 4 Drawing Figures

SCARFING TORCH

BACKGROUND OF INVENTION

The use of metal powder as a scarfing starting aid is known. As is evident from German Pat. No. DE-PS 10 16 102, a powder supply apparatus is associated with a scarfing torch consisting of a large number of individual nozzles. This powder supply apparatus consists of a supply bin from which the powder arrives at a distributor which supplies each time a powder discharge nozzle via several pipelines.

SUMMARY OF INVENTION

An object of the present invention is to provide a scarfing torch of the above type in such a way that the metal powder experiences a better supply to the workpiece surface in the reaction zone.

In order to meet this object, it is proposed according to the invention that the powder supply consists of at least one nozzle which is provided in one of the preheating blocks. It is advantageous in the preferred embodiment of the invention when the nozzle for the powder is arranged in the upper preheating block. It is here, moreover, advantageous when the nozzle is arranged between the scarfing oxygen channel and the discharge nozzles for the preheating flames. It is, moreover, advantageously possible in addition that at least one discharge bore for a protective oxygen stream is present between the nozzle for the powder and the discharge nozzles.

As a result of the inventive arrangement of the nozzles for the scarfing powder in the preheating block and, to be sure, advantageously in such a way that the powder jet discharges from the scarfing torch between the scarfing oxygen jet and the preheating flames in a so-called protective oxygen stream, the metal powder flow is prevented from being deflected upward or downward. The metal powder is, therefore conducted between and through the two streams (preheating flames/protective oxygen and scarfing oxygen) to the reaction zone so that a liquification of the metal powder only occurs shortly before striking the workpiece surface. As a result, the high preheating temperature (i.e., rapid ignition) characteristic for a powder scarfing startup is produced immediately at the reaction zone and not already before.

The scarfing oxygen jet has a low intensity during the ignition procedure, which is adequate, however, to support the powder on its path from the scarfing torch to the reaction spot (on the workpiece).

The scarfing oxygen jet is only adjusted to full intensity (i.e., for scarfing) after achieved ignition.

THE DRAWINGS

DETAILED DESCRIPTION

Figure 1:
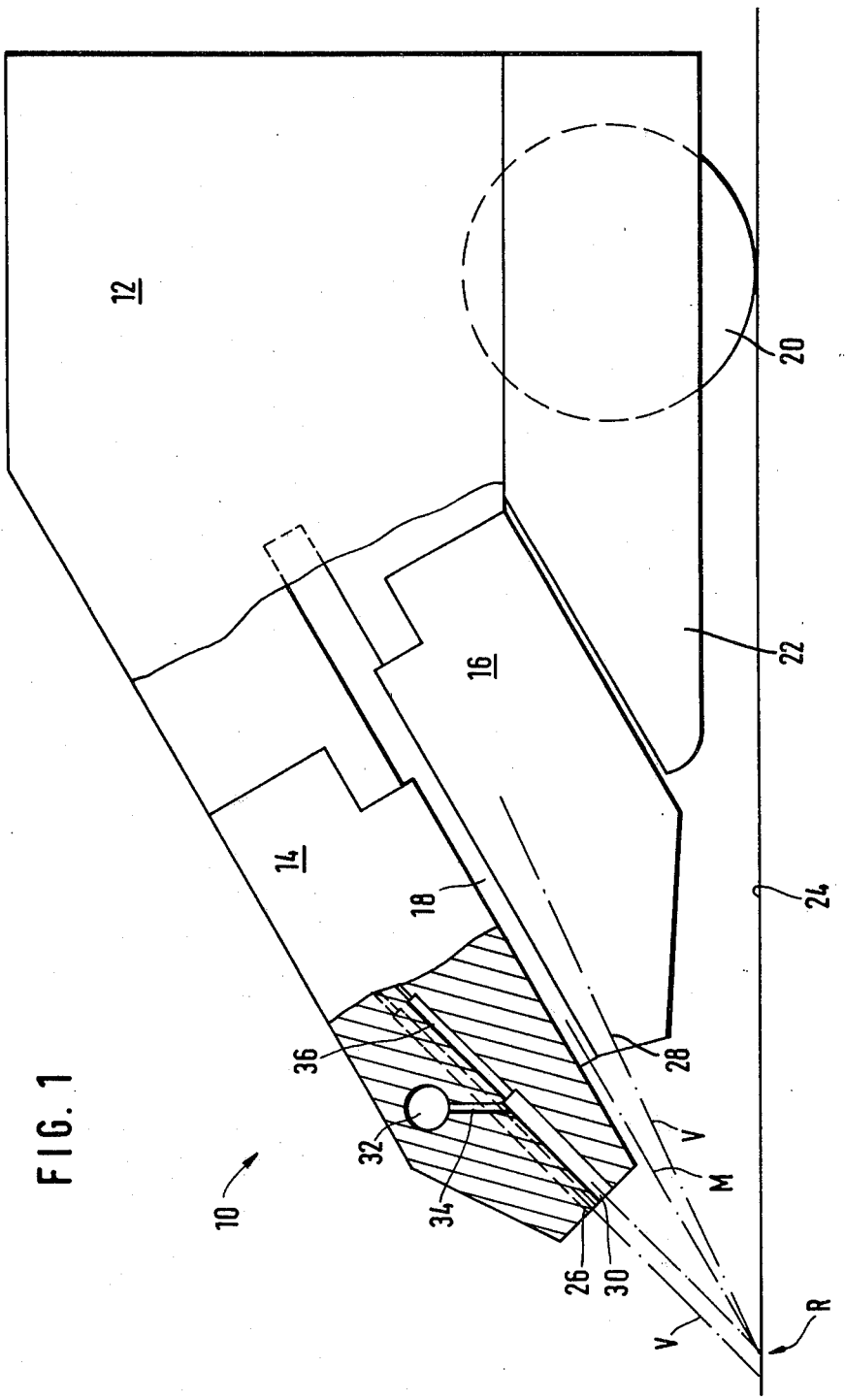
FIG. 1 shows the side view of a scarfing torch in accordance with this invention in partial cross section.

FIG. 1 shows a scarfing torch 10 according to the invention. This scarfing torch consists of a main component 12 where the gas supply is located and which is connected at the same time to an upper and a lower preheating blocks 14 and 16.

The two preheating blocks 14, 16 are arranged at a distance from each other in order to form a scarfing oxygen channel 18.

The scarfing torch is supported by a holding shoe 22 equipped with a roll 20. The roll 20 rests on the workpiece 24 to be scarfed in such a way that a relative movement between workpiece 24 and the scarfing torch 10 fastened to a scarfing machine (not shown) can take place during the scarfing procedure.

It can also be seen in the drawing that a row of discharge nozzles 26, 28 for the preheating flames is each time arranged in the two preheating blocks 14, 16. The two rows of discharge nozzles 26, 28 are aligned in such a way that the preheating flames V meet at the surface of the workpiece 24 approximately in a line R (i.e., reaction zone). It can be seen (compare specifically FIGS. 1 and 2) that at least one nozzle 30 for the supply of the metal powder (scarfing powder) to the reaction zone R is provided according to the invention in the upper preheating block 14. It is obvious and found within the scope of the invention that also several nozzles 30 instead of one single nozzle can be provided as arranged in dotted lines in FIG. 2.

The nozzle 30 is connected via a branched bore 34 to a cross channel 32 (when several nozzles are present, several branched bores are, of course, provided) which again is connected to the powder supply apparatus (pipelines, shutoff valves, supply bin, etc.) (not shown).

Figure 2:
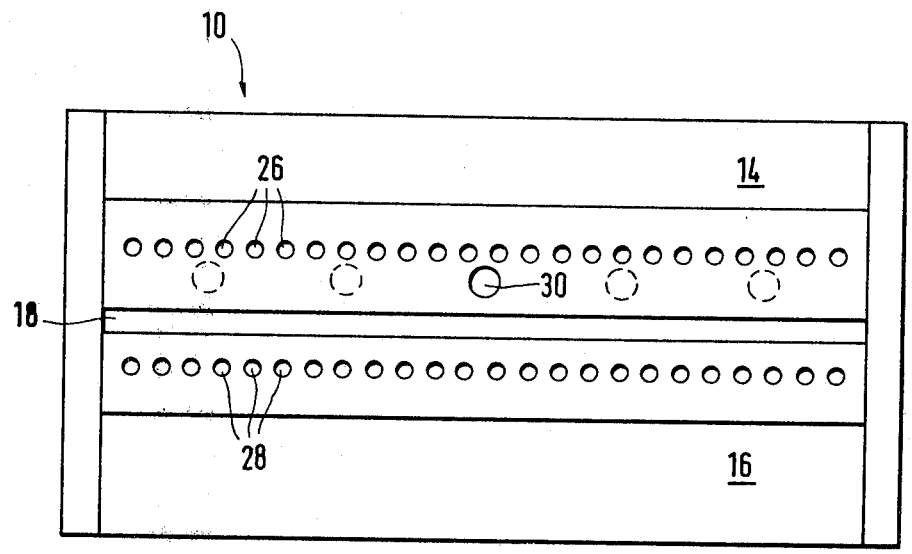
FIG. 2 shows a front view of the torch of FIG. 1.

In the exemplified embodiment of FIGS. 1 and 2, the metal powder flows from the cross channel 32 and through the branched bore 34 into the nozzle 30 which again is connected to a compressed air channel 36 at its back (inside) end. The discharging compressed air carries the metal powder injector-like along and brings it in the form of a metal powder-compressed air jet to the area of the reaction zone R.

It can be, furthermore, seen that the nozzle 30 (or the nozzles 30) in FIGS. 1 and 2 is provided below the upper row of discharge nozzles 26 so that the metal powder is conducted into the direction of reaction zone R between the upper preheating flames V and a scarfing oxygen stream flowing with a low intensity. This "shielding" according to the invention assures that the metal powder is transported protected to the reaction zone R and is only liquified there shortly before striking.

Figure 4:
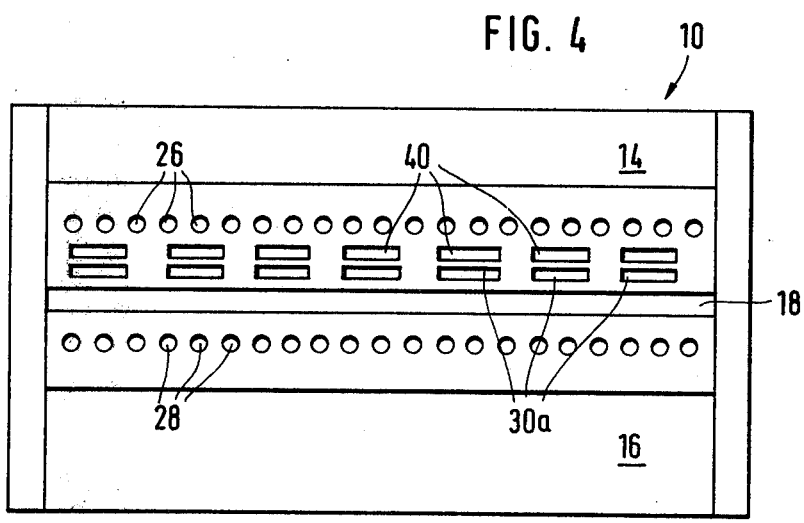
FIG. 4 shows a front view of the torch of FIG. 3.
Figure 3:
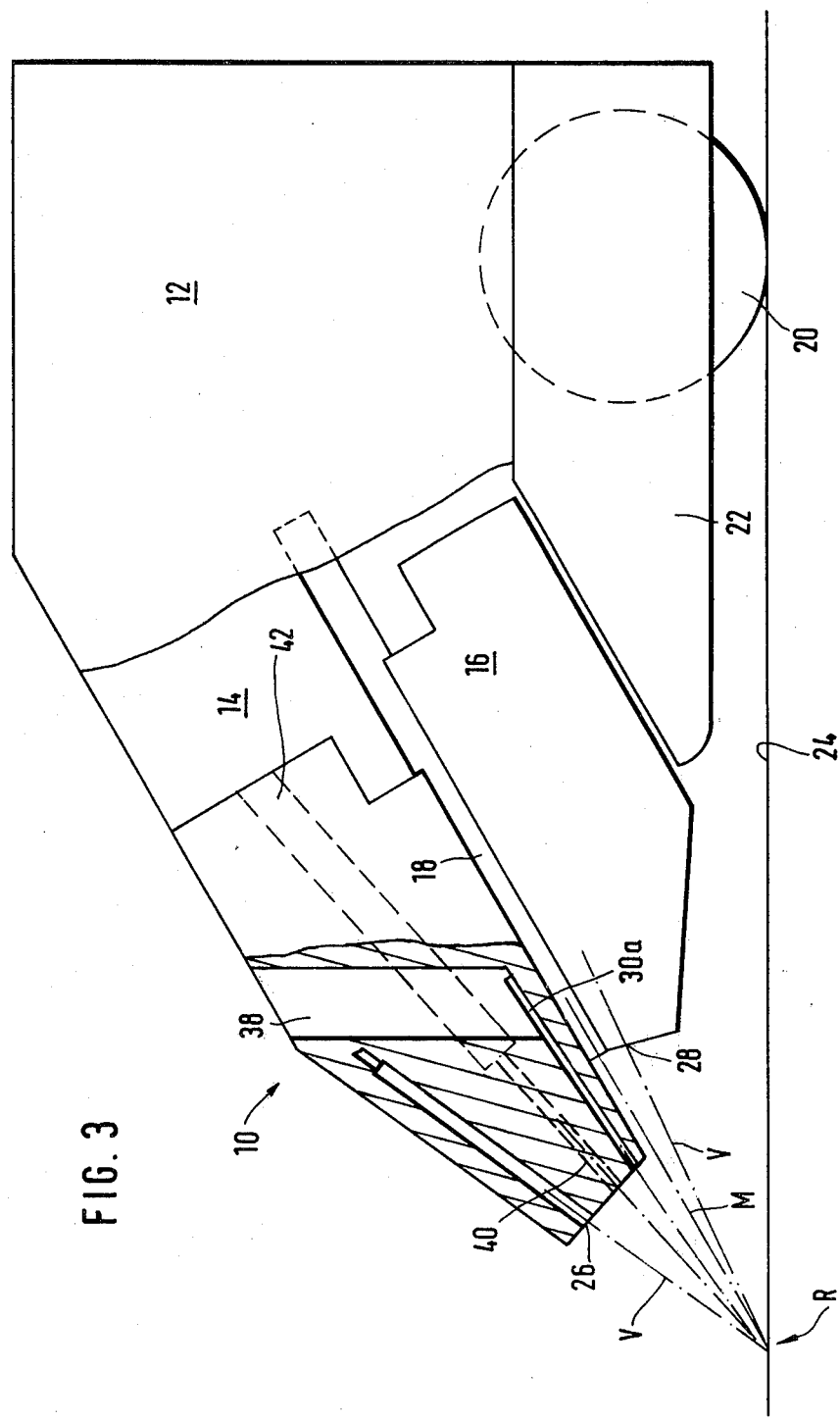
FIG. 3 shows the side view of a scarfing torch in partial cross section in a different embodiment.

In the embodiment shown in FIGS. 3 and 4, several slot-shaped nozzles 30a for the metal powder are provided instead of one nozzle 30. These slot-shaped nozzles 30a are connected to the powder supply apparatus (not shown), from which the metal powder is supplied to the nozzles 30a already in the form of a powder-compressed air mixture, via bores 38 in the upper preheating block 14.

In order to shield the metal powder jets upward, discharge bores 40 for a protective oxygen stream are additionally provided in this embodiment. These discharge bores, also slot-shaped, may be either provided exactly above the nozzles 30a (see FIG. 4) or laterally displaced; this depends on the arrangement of the channels 42 for the supply of the protective oxygen inside the preheating block 14.

The oxygen (or also compressed air) discharging from the discharge bores 40 now functions as a protective shield for the metal powder instead of the preheating flames V in order to prevent an upward deflection.

The scarfing oxygen jet which first discharges with a low intensity and, therefore, affects a protection and which is later, after achieved ignition, adjusted to full scarfing intensity functions here as well as the lower protection.

As a result of the upward protection of the metal powder compressed air mixture (preheating flames from protective oxygen or compressed air) and the downward protection (scarfing oxygen with low intensity) according to the invention, it is advantageously assured that the metal powder is conveyed without deviation to the reaction zone R (see in this respect also the reference symbols in FIGS. 1 and 3) so that the metal powder is only liquified immediately before the reaction zone R and "releases" in this way the high heat energy needed for a rapid scarfing startup only at the required spot.

What is claimed is:

1. In a scarfing torch for the thermochemical machining of metal workpiece surfaces including upper and lower preheating blocks which are arranged at a distance from each other to form a scarfing oxygen channel with a powder supply associated with the scarfing torch, the improvement being said powder supply includes at least one nozzle which is provided in one of said preheating blocks.

2. Scarfing torch according to claim 1, characterized in that said powder nozzle is arranged in said upper preheating block.

3. Scarfing torch according to claims 1 or 2, characterized in that said powder nozzle is arranged between said scarfing oxygen channel and the discharge nozzles for the preheating flames in said one preheating block.

4. Scarfing torch according to claim 3, characterized in that at least one discharge bore for a protective oxygen stream is present between said powder nozzle and said discharge nozzles.

5. Scarfing torch according to claim 1, characterized in that a plurality of said powder nozzles are provided in said one preheating block.

6. Scarfing torch according to claim 5, characterized in that a discharge bore for the protective oxygen stream is associated with each of said powder nozzles.

* * * * *